Aug. 24, 1965                H. A. FROMSON                3,202,588
                METHOD OF MAKING DECORATIVE METAL SHEET
                        Filed Aug. 30, 1961
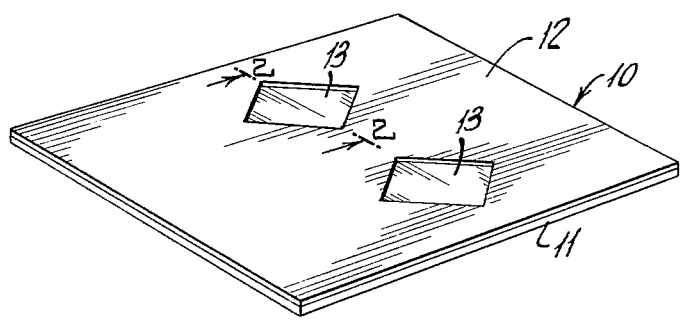
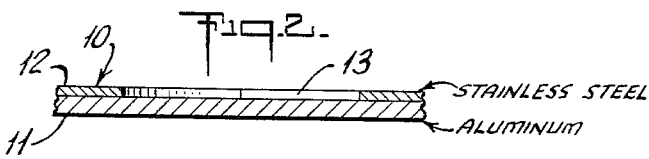
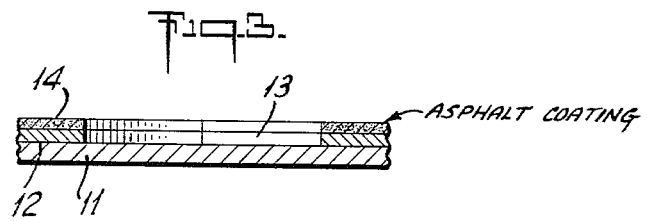
INVENTOR
HOWARD A. FROMSON
BY
Burgess, Ryan & Hicks
ATTORNEY 3,202,588
METHOD OF MAKING DECORATIVE METAL SHEET
Howard A. Fromson, Rogues Ridge Road, Weston, Conn.
Filed Aug. 30, 1961, Ser. No. 135,042
7 Claims. (Cl. 204—18)

The present invention relates to a decorative metal sheet and a method of making the same. It relates, more particularly, to a decorative metal sheet having a surface containing adjoining areas of stainless steel and aluminum of contrasting colors which form a design or pattern in the surface of the sheet and the method of making a decorative metal sheet with such a surface.

An object of the present invention is to provide a decorative metal panel or sheet having a surface of stainless steel with a permanent pattern or design of contrasting color formed therein. Another object of the invention is to provide an inexpensive method of making a decorative metal panel or sheet having such a surface. As is well known, the properties of stainless steel make it difficult to form patterns or designs of contrasting colors on the surface of a sheet of stainless steel and the practice of applying lacquers to such a surface is not entirely satisfactory because of the lack of permanency and the application of more permanent enamel frits to such a surface is difficult and expensive. The present invention overcomes these problems and provides a way of forming designs in the surface of stainless steel which is both inexpensive and permanent.

Other objects and advantages of the present invention will be apparent and better understood from the following description and the accompanying drawing, in which:

FIG. 1 is a perspective view illustrating a decorative metal sheet embodying the invention;

FIG. 2 is a vertical section view taken along line 2—2 of FIG. 1, but on an enlarged scale; and FIG. 3 is a view corresponding to FIG. 2, but illustrating the sheet at one stage of its production.

It will be understood that figures shown in the accompanying drawings are diagrammatic illustrations for the purpose of describing the invention and are not necessarily drawn to scale. Also, various designs or patterns can be formed in the surface of the sheet as desired.

Referring to the drawings, there is a composite metal sheet 10 having a bottom or backing layer 11 of aluminum and a upper layer 12 of stainless steel.

The layer of stainless steel may be clad to the layer of aluminum in any suitable manner and the two layers are preferably metallurgically bonded together. The stainless steel layer is supported by the aluminum layer and hence, can be made relatively thin with the aluminum layer being of considerably greater thickness. For example, the stainless steel layer may be about .006 inch thick and the layer of aluminum may be about .075 inch thick, giving a total thickness of about .081 inch. The aluminum layer imparts strength and rigidity to the thin stainless steel layer and reduces the cost of the sheet.

In the final product, as shown in FIG. 1, the stainless steel layer contains openings 13 defining a pattern or design and through which areas of the upper surface of the supporting layer of aluminum are exposed. The exposed surface areas of the aluminum layer are anodized and dyed to a color which contrasts with the color of the surrounding untreated surfaces of the stainless steel layer. However, both the anodized surfaces of the aluminum and the surrounding surfaces of the stainless steel layer are resistant to corrosion and require little upkeep or maintenance.

In producing the decorative sheet described above, the following procedure is followed:

Starting with the composite sheet having the thin layer of stainless steel and the thicker supporting layer of aluminum, a protective coating 14 of a stop-off or resist which is capable of withstanding the action of an anodizing bath is applied to selected areas of the upper or exposed surface of the stainless steel layer. The protective coating can be asphalt, pressure sensitive adhesive tape which is acid resistant, various resins or the like and where the coating is applied in the form of a liquid or paste it can be applied to selected areas of the stainless steel surface through a silk screen or other suitable printing media.

When the selected areas of the surface of the stainless steel layer have been masked by the protective coating, the stainless steel layer defined by the uncoated areas is removed either mechanically or by etching to expose the underlying surface areas of the aluminum layer. Since the stainless steel layer is relatively thin, its removal in the uncoated areas can be readily accomplished by means of a grinding or milling tool or etching through the uncoated surfaces with a suitable acid, such as hydrochloric acid.

As an alternative, the protective coating may be applied to the entire surface of the stainless steel layer and the stainless steel layer can then be removed in predetermined areas by grinding or cutting through the protective coating and the stainless steel layer with suitable tools to expose the surface of the aluminum in such areas and to form the desired pattern or design. This may be more readily accomplished by embossing in the stainless steel the pattern surface of the composite sheet prior to applying the protective coating thereto. In such embossing, the level of pattern areas can be raised to a height at least equal to the thickness of the stainless steel layer. The stainless steel layer can then be removed from the embossed or raised areas without difficulty by a grinding or milling tool and a smooth, flat surface will be obtained.

After the surface areas of the aluminum layer forming the pattern or design have been exposed and while the protective coating remains on the surrounding surfaces of the stainless steel layer, the exposed surface areas of the aluminum layer are then anodized by placing the sheet in a standard sulphuric acid anodizing bath under normal conditions at 70° F. for a period of 20 minutes. In the anodizing operation, electrical contact is made with the aluminum layer and in order to anodize the exposed surface areas thereof, it is essential that the surrounding surface areas of the stainless steel layer be covered with the protective coating. Otherwise, the exposed surface areas of the aluminum layer will not be anodized and the surface of the stainless steel layer will be attacked by the action of the anodizing bath.

After removal from the anodizing bath, the anodized surfaces of the aluminum are colored by immersing the sheet with an aqueous dye solution at elevated temperature. Thereafter, the anodized and colored surface areas of the aluminum layer are sealed by immersing the sheet in hot water (170° F.) for about 20 minutes.

After the exposed surface areas of the aluminum sheet have been treated in this manner, the protective coating on the surrounding surface areas of the stainless steel layer is then removed by means of a suitable solvent or by stripping the tape from such surfaces.

It will be understood that various modifications and changes may be made in the procedure described above without departing from the spirit or scope of the invention as defined by the following claims.

I claim:

1. The method of producing a decorative surface on a composite sheet having a layer of stainless steel joined to an underlying layer of aluminum, which comprises coating the surface of the stainless steel layer with a protective acid-resisting material, then removing predetermined portions of the stainless steel layer and exposing surface areas of the underlying aluminum layer, then anodizing the exposed surface areas of the aluminum layer and then removing the coating of protective material from the surface of the stainless steel layer.

2. The method of producing a decorative surface on a composite sheet as defined in claim 1 wherein the exposed surface areas of the aluminum sheet are anodized and dyed to a color different than the color of the surface of the stainless steel layer.

3. The method of producing a decorative surface on a composite sheet as defined in claim 1 wherein the coating of protective material is applied by printing said coating on selected surface areas of the stainless steel layer and the stainless steel layer defined by the uncoated areas is removed.

4. The method of producing a decorative surface on a composite sheet as defined in claim 1 wherein the coating of protective material is applied by printing said coating on selected surface areas of the stainless steel layer and the stainless steel layer defined by the uncoated areas is removed by etching through said layer with an acid.

5. The method of producing a decorative surface on a composite sheet as defined in claim 1 wherein the protective coating is applied to the entire surface of the stainless steel layer and the predetermined portions of the stainless steel layer are removed by cutting through said coating and the stainless steel layer.

6. The method of producing a decorative surface on a composite sheet as defined in claim 5 wherein the surface of the sheet is embossed to raise the predetermined portions of the stainless steel layer to the level above the remaining portions of the steel by a distance at least equal to the thickness of the stainless steel layer and said raised portions of the stainless steel layer are removed to expose the surface of the underlying aluminum layer.

7. The method of producing a decorative surface on a composite sheet as defined in claim 1 wherein the surface of the sheet is embossed to raise the predetermined portions of the stainless steel layer to the level above the remaining portions of the sheet by a distance at least equal to the thickness of the stainless steel layer and said raised portions of the stainless steel layer are ground away to expose the surface of the underlying aluminum layer.

References Cited by the Examiner
UNITED STATES PATENTS

| | | | |
|---|---|---|---|
| 268,469 | 12/82 | Edge. | |
| 1,346,475 | 7/20 | Warga. | |
| 1,586,927 | 6/26 | Wilkinson | 29—199 |
| 2,291,854 | 8/42 | Whyzmuzis. | |
| 2,586,099 | 2/52 | Schultz | 29—196.2 |
| 2,639,490 | 5/53 | Brennan | 117—38 X |
| 2,715,765 | 8/55 | Brown | 29—424 |
| 2,837,817 | 6/58 | Kelley | 29—424 |
| 2,841,083 | 7/58 | Kirkpatrick | 29—424 X |
| 2,845,365 | 7/58 | Harris | 29—195 X |
| 2,883,739 | 4/59 | Russell | 29—196.2 |
| 2,908,073 | 10/59 | Dulin | 29—196.2 |
| 2,941,282 | 6/60 | Fromson | 29—197.5 X |
| 2,999,034 | 9/61 | Heidenhain | 117—38 X |

DAVID L. RECK, *Primary Examiner.*

HYLAND BIZOT, *Examiner.*